US012560669B2

(12) United States Patent
Petre et al.

(10) Patent No.: US 12,560,669 B2
(45) Date of Patent: Feb. 24, 2026

(54) SYSTEMS, METHODS, AND APPARATUS FOR ESTIMATING ANGLE OF ARRIVAL

(71) Applicant: The Boeing Company, Chicago, IL (US)

(72) Inventors: Peter Petre, Chicago, IL (US); Peter S. Wittenberg, Chicago, IL (US); Andrew D. Smith, Chicago, IL (US)

(73) Assignee: The Boeing Company, Arlington, VA (US)

( * ) Notice: Subject to any disclaimer, the term of this patent is extended or adjusted under 35 U.S.C. 154(b) by 470 days.

(21) Appl. No.: 18/065,266

(22) Filed: Dec. 13, 2022

(65) Prior Publication Data

US 2024/0192301 A1 Jun. 13, 2024

(51) Int. Cl.
| | |
|---|---|
| *G01S 3/72* | (2006.01) |
| *G01S 3/46* | (2006.01) |
| G01S 3/10 | (2006.01) |
| G01S 3/74 | (2006.01) |

(52) U.S. Cl.
CPC ................. *G01S 3/46* (2013.01); *G01S 3/72* (2013.01); *G01S 3/10* (2013.01); *G01S 3/74* (2013.01)

(58) Field of Classification Search
CPC ... G01S 3/043; G01S 3/10; G01S 3/46; G01S 3/74; G01S 3/72; H01Q 3/26
USPC ........................................ 342/445, 417, 421
See application file for complete search history.

(56) References Cited

U.S. PATENT DOCUMENTS

| | | | | |
|---|---|---|---|---|
| 5,525,997 A | * | 6/1996 | Kwon ...................... | G01S 3/023 |
| | | | | 342/174 |
| 5,990,834 A | * | 11/1999 | Barrick ................... | G01S 13/42 |
| | | | | 342/195 |
| 7,242,350 B1 | * | 7/2007 | Pozgay ..................... | G01S 3/04 |
| | | | | 342/417 |
| 8,121,225 B1 | * | 2/2012 | Francis ..................... | G01S 3/46 |
| | | | | 342/429 |
| 8,144,057 B1 | * | 3/2012 | Minkoff ................... | G01S 3/74 |
| | | | | 342/422 |

(Continued)

FOREIGN PATENT DOCUMENTS

| | | | | | |
|---|---|---|---|---|---|
| EP | | 1398645 A1 | * | 3/2004 | ............... G01S 3/74 |
| JP | | 2007309846 A | * | 11/2007 | ............... G01S 3/74 |

OTHER PUBLICATIONS

Extended European Search Report prepared by the European Patent Office in application No. EP 23 21 2538.5 dated May 16, 2024.

*Primary Examiner* — Chuong P Nguyen
(74) *Attorney, Agent, or Firm* — Harrity & Harrity, LLP

(57) ABSTRACT

Systems, methods, and apparatus for processing signals using a sensor arrays are disclosed. In one aspect, an apparatus comprising a sensor array and a computing device is provided. The computing device may comprise one or more processors configured to generate a data matrix based on one or more signals received at each of the plurality of sensor and to determine a covariance matrix based on the data matrix. The one or more processors may also be configured to decompose the covariance matrix into a matrix of eigenvalues and a matrix of eigenvectors and to determine a projected data matrix based on applying the data matrix to the eigenvector matrix. Further, the one or more processors may be configured to determine a denoised projected data matrix based on denoising the projected data matrix and to determine a denoised data matrix based on the denoised projected data matrix.

20 Claims, 3 Drawing Sheets

(56) References Cited

U.S. PATENT DOCUMENTS

| | | | | |
|---|---|---|---|---|
| 10,203,397 B2 * | 2/2019 | Sendonaris | ............... | G01S 1/04 |
| 11,169,240 B1 * | 11/2021 | Shima | ........................ | G01S 3/48 |
| 11,460,531 B2 * | 10/2022 | Dougherty | ................ | G01S 3/06 |
| 2008/0231505 A1 | 9/2008 | Zhu et al. | | |
| 2021/0021307 A1 | 1/2021 | Shattil | | |
| 2022/0149889 A1 | 5/2022 | Laporte et al. | | |
| 2022/0179031 A1 | 6/2022 | Zhou et al. | | |
| 2024/0361426 A1 * | 10/2024 | Petre | ........................ | G01S 7/354 |

* cited by examiner

SYSTEMS, METHODS, AND APPARATUS FOR ESTIMATING ANGLE OF ARRIVAL

FIELD

The present disclosure relates to signal processing, and more particularly, to denoising signals and estimating the angle of arrival based on the denoised signals.

BACKGROUND

This background description is provided for the purpose of generally presenting the context of the disclosure. Unless otherwise indicated herein, material described in this section is neither expressly nor impliedly admitted to be prior art to the present disclosure or the appended claims.

Wireless communications technologies continue to advance rapidly, enabling increasingly larger transmission and reception bandwidth. Many communication systems may receive multiple signals from multiple sources on a wide range of frequencies. In real-world situations, it may be important to identify and locate the sources of these signals. Furthermore, it may be necessary to calculate the direction or angle of arrival for multiple signals received simultaneously. Many known methods to calculate the direction of arrival may be calculation intensive, require too long to calculate to be effective, and/or provide inaccurate or inconsistent results. For many applications, the accuracy of calculating the angle of arrival are vitally important. Accordingly, it would be useful to have a system that provides accuracy in angle of arrival calculations without requiring significant additional hardware.

SUMMARY

The present application is directed to embodiments that relate to systems, methods, and apparatus for processing signals, such as wireless communications, using sensor arrays. The sensor arrays may receive signals emitted by one or more sources in an environment. The embodiments may be configured to denoise the received signals to achieve high signal-to-noise ratios (SNR). The embodiments may use the de-noised signals for estimating the angle of arrival (AOA) of the signals received by the sensor array. The embodiments may estimate the angle of arrival (AOA) with higher accuracy compared to other signal processing systems. Further, the embodiments may determine the angles of arrival of multiple simultaneous signals and provide maximum signal gain towards all of the received signals. The features of the embodiments may provide many benefits for applications such as communication, automotive anti-collision radars, and electronic warfare.

In one aspect, an apparatus including a sensor array and a computing device is provided. The sensor array may have a plurality of sensors each configured to receive one or more signals. The computing device may comprise at least one processor. The at least one processor may be configured to generate a data matrix based on at least one signal received at each of the plurality of sensors and to determine a covariance matrix based on the data matrix. The at least one processor may also be configured to decompose the covariance matrix into a matrix of eigenvalues and a matrix of eigenvectors and to determine a projected data matrix based on applying the data matrix to the eigenvector matrix. Further, the at least one processor may be configured to determine a denoised projected data matrix based on denoising the projected data matrix and to determine a denoised data matrix based on the denoised projected data matrix.

In another aspect, a method is provided. The method may include receiving one or more signals at a sensor apparatus having a plurality of sensors. Each of the sensors may be configured to receive one or more signals. The method may also include generating a data matrix based on at least one signal received at each of the plurality of sensors and determining a covariance matrix based on the data matrix. Further, the method may include decomposing the covariance matrix into a matrix of eigenvalues and a matrix of eigenvectors and determining a projected data matrix based on applying the data matrix to one or more of the eigenvectors. Additionally, the method may include determining a denoised projected data matrix based on denoising the projected data matrix and determining a denoised matrix based on the denoised projected data matrix.

In a further aspect, a non-transitory computer-readable medium storing instructions is disclosed that, when the instructions are executed by one or more processors, causes the one or more processors to perform operations. The operations may include generating a data matrix based on one or more received signals and determining a covariance matrix based on the data matrix. The operations may also include decomposing the covariance matrix into a matrix of eigenvalues and a matrix of eigenvectors and determining a projected data matrix based on applying of the data matrix to one or more of the eigenvectors. Further, the operations may include determining a denoised projected data matrix based on denoising the projected data matrix and determining a denoised matrix based on the denoised projected data matrix.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE DRAWINGS

A more complete understanding of embodiments of the present application may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
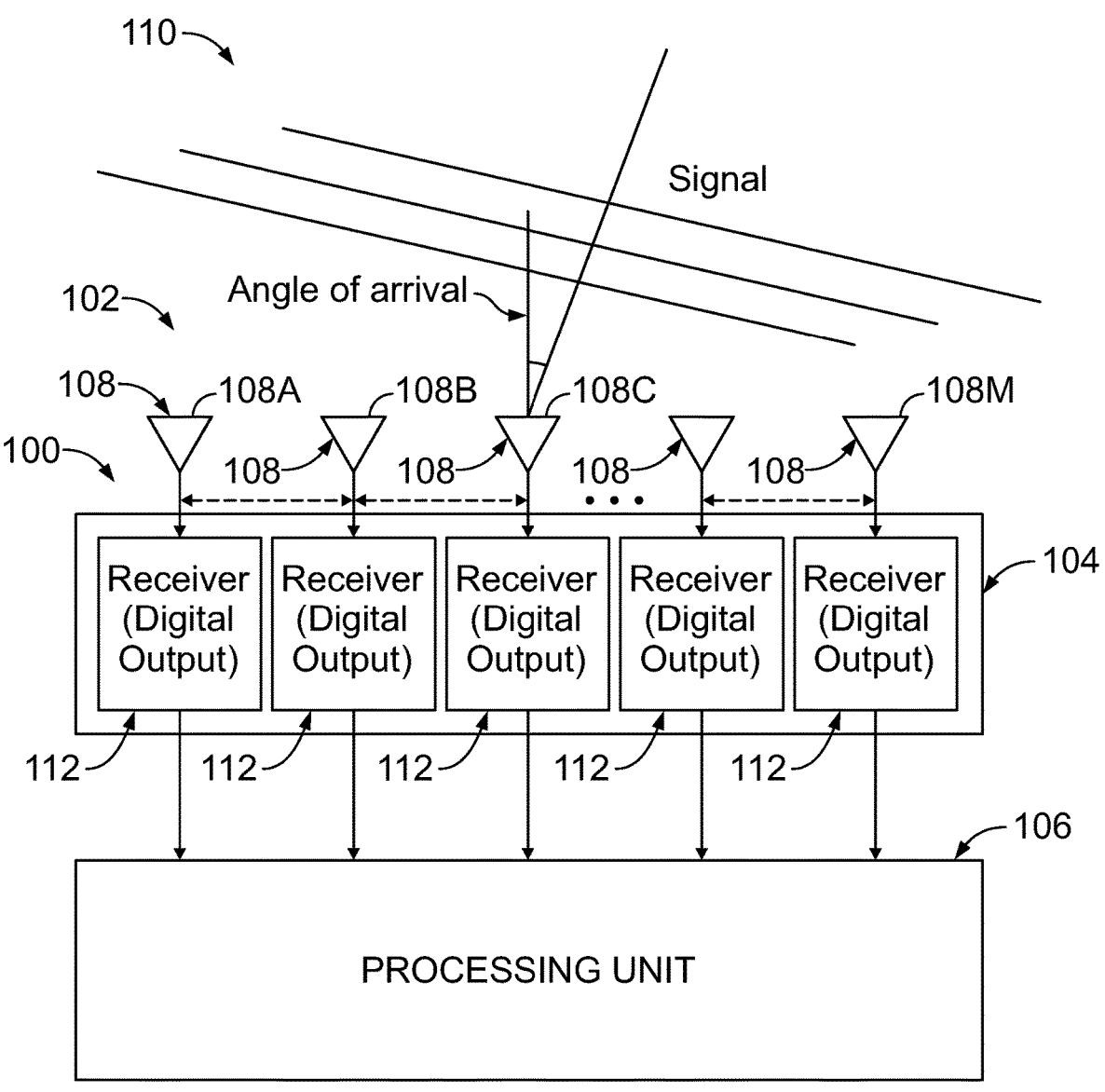
FIG. 1 is a simplified block diagram illustrating a system for processing signals, according to an example embodiment.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature may be used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, sensors are illustrated and associated with reference number 108. When referring to a particular one of the sensors, such as the sensor 108A, the distinguishing letter "A" may be used. However, when referring to any arbitrary one of the sensors or to the sensors as a group, the reference number 108 may be used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

The present application is directed to embodiments that relate to systems, methods, and apparatus for processing signals, such as wireless communications, using sensor arrays. The sensor arrays may receive signals emitted by one or more sources in an environment. The embodiments may be configured to denoise the received signals to achieve high signal-to-noise ratios (SNR). The embodiments may use the de-noised signals for estimating the angle of arrival of the signals received by the sensor array. The embodiments may estimate the angle of arrival (AOA) with higher accuracy compared to other signal processing systems. Further, the embodiments may determine the angles of arrival of multiple simultaneous signals and may provide maximum signal gain towards all of the signals. The features of the embodiments may provide many benefits for applications such as communication, automotive anti-collision radars, and electronic warfare.

Referring now to the drawings, and more particularly to FIG. 1, a block diagram of a system 100 is illustrated for processing signals, in accordance with an exemplary implementation. In one embodiment, the system 100 may be configured to receive and process signals (e.g., wireless signals) emitted from one or more sources in an environment. The signals may represent electromagnetic energy or waves of any type that may be received by the system 100. For example, the signals may include radar and/or radio frequency (RF) signals. In some embodiments, the signal may include far field plane waves. The system 100 may be configured to denoise the received signals to achieve high signal-to-noise ratios (SNR). The system 100 may also estimate the angles of arrival (AOA) of the received signals with high accuracy based on the denoised signals.

As shown in FIG. 1, the system 100 includes a sensor array 102, a receiver unit 104, and a computing device or processing unit 106. The sensor array 102 may be communicatively coupled to the receiver unit 104 and may be configured to receive or detect electromagnetic signals from one or more sources. The sensor array 102 may include M sensors 108. The M sensors 108 may be configured to transmit and/or receive signals. In one embodiment, the sensor array 102 may include an antenna array having multiple antennas. The sensor array 102 may have any suitable configuration or geometry. For example, the sensor array 102 may have any suitable number of sensors which can be positioned in any desirable pattern/orientation to obtain a particular field of view, sensitivity, etc. For example, the M sensors 108 of the sensor array 102 may be uniformly or non-uniformly spaced, arranged linearly or non-linearly (e.g., curved), and so forth. The sensor array 102 may be a 1-dimensional (1D) array, a 2-dimensional (2D) array, or a 3-dimensional (3D) array.

The M sensors 108 of the sensor array 102 may be configured to sample the electromagnetic field and to generate an electrical signal in response to an incident electromagnetic signal. For example, each of the M sensors 108 of the sensor array 102 may receive signals and provide output signals (e.g., a channel) corresponding to the signals received by the M sensors 108. The signal 110 may arrive at each sensor 108A-108M at slightly different times, which causes the phase of the signal 110 received at the M sensors 108 of the sensor array 102 to be different and to arrive at different times. The signal 110 may arrive at an angle $\theta$ relative to the M sensors 108 of the sensor array 102. The signals received by the sensors 108 may include signals derived from different sources or transmitters. For example, the signals may include a combination of signals from one or more sources. The signal received by the M sensors 108 of the sensor array 102 may also include background or environmental noise (e.g., a noise signal).

Each sensor 108A-108M of the sensor array 102 may be configured to receive a signal and provide a separate data stream or channel. The M sensors 108 may be configured to take N time samples of the signal at time points $t_i$, $i=1, \ldots$ , N. The M sensors 108 may be configured to be sampled at the same time as each other. For example, each sensor may be sampled simultaneously at a time index t to produce an output signal. The output signals of the sensor array 102 may include signal or data elements $x_1$, $x_2$, $x_3$, . . . , $x_M$ representing the output signal from each of the individual sensors.

The output signals of the sensor array 102 for N sampling times may be denoised and used to determine the angle of arrival (AOA) of the received signals as further described below. In some embodiments, each of the signals may be assumed to be received at a constant angle during a sampling time or interval. When the sampling times of the signals are uniform or at predetermined intervals, the angle of arrival (AOA) of the signals may be calculated with the highest accuracy (e.g. $\sigma > 0.000001°$). Even when the signals are sampled at non-uniform time intervals, the angle of arrival (AOA) may still be calculated with high accuracy (e.g., $\sigma > 0.001°$).

Referring still to FIG. 1, the receiver unit 104 of the system 100 may be configured to receive the output signals generated by each of the M sensors 108 of the sensor array 102 and process the output signals. As shown in FIG. 1, the receiver unit 104 may be communicatively connected to be each of the M sensors 108 of the sensor array 102. The receiver unit 104 may include M receivers 112 (e.g., M receiver circuits). Each of the M receivers 112 may be coupled to a respective sensor of the sensor array 102 and may receive, as an input, the output signals or channel generated by the respective sensor.

The M receivers 112 of the receiver unit 104 may each include to an analog-to-digital (A/D) converter (not shown) operatively coupled or connected to a respective sensor of the sensor array 102. In some embodiments, each of the M receivers 112 may be operatively coupled or connected to a respective ADC by an amplifier and/or other components. Each of the M receivers 112 of the receiver unit 104 may be configured to downconvert the frequency of the output signals received from a respective sensor and to demodulate the converted signal to a signal comprising an orthogonal I signal and a Q signal. The receiver unit 104 may be configured to sample the respective I signals and Q signals of the demodulated signal and convert the demodulated signals to a digital signal (e.g., a complex baseband IQ signal). The digital signal may have the I signal as the real part and the Q signal as the imaginary part. The digital signal may include the signal or data elements $x_1, x_2, x_3, \ldots, x_N$ for the N receivers at each time t. The receiver unit 104 may output the data elements for each time sample to the processing unit 106 for denoising and determining the angle of arrival (AOA) of the received signals as further described below.

The processing unit 106 of the system 100 may receive the digital signals (e.g., complex baseband IQ signals) from the receiver unit 104 and process the digital signals. The processing unit 106 may be configured to denoise the digital signals. In some embodiments, the processing unit 106 may include a multiple input denoiser or module configured to de-noise input signals. The processing unit 106 may also be configured to estimate the angles of arrival for the received signals based on the denoised data as further described below. In some embodiments, the processing unit 106 may be incorporated in or may be part of the receiver unit 104. Further, the processing unit 106 may generate data, which may be utilized to generate signals to be transmitted by the sensors. For example, the processing unit 106 may determine coefficient data that may be utilized for precoding and/or beamforming of transmission signals.

The processing unit 106 may be configured to receive the data elements $x_1, x_2, x_3, \ldots x_M$ of the digital signals (e.g., complex baseband IQ signals) for N time samples from each of M sensors 108 of the sensor array 102. The number of time samples N may be greater than the number of the M sensors. For example, N samples may be several hundred to several thousand samples. The processing unit 106 may be configured to generate a data vector based on the digital elements received from each of the M sensors 108 at a sampling time t. The data vector may define the magnitude and phase of the signals received at the M sensors 108 of the sensor array 102 from a source or transmitter. Each data vector may be a row vector that includes M values in the vector, where M is equal to the number of sensors in the sensor array 102. The data vector may be as expressed in the form:

$$\underline{x}(t_i) M \times 1 = \{x_i(t)\}$$

where $i = 1, 2, \ldots, M$ at each time t.

In some embodiments, the processing unit 106 may create a data vector x(t) expressed as:

$$x(t) = [x_1(t_N), x_2(t_N) \ldots x_M(t_N)]^T$$

where T represents a transpose of a vector. For example, at time $t_1$, the data vector of the digital elements $[x_1(t_1), x_2(t_1), \ldots x_M(t_1)]^T$ generated by the processing unit 106 may be expressed as $\underline{x}(t_1)$ M×1 and, at time $t_2$, the data vector of the digital elements $[\underline{x}_1(t_2), x_2(t_2), \ldots x_M(t_2)]^T$ generated by the processing unit 106 may be expressed $x(t_2)$ M×1. At time t, the data vector of the digital elements $[x_1(t_N), x_2(t_N) \ldots x_M(t_N)]^T$ generated by the processing unit 106 may be expressed as $\underline{x}(t_N)$ M×1.

In some embodiments, the processing unit 106 may discard one or more of the data elements $x_1, x_2, x_3, \ldots x_M$ of the data vectors. For example, the processing unit 106 may discard a data element when the quality of the signal has been degraded. If the processing unit 106 discards a digital element of a sensor, the processing unit 106 may discard the data elements of the other sensors for that particular time. Thus, the processing unit 106 may discard the entire data vector even if only one data element of a sensor has been degraded. In some embodiments, the processing unit 106 may discard all of the data elements or channel for a particular sensor and process the data elements of the other sensors using the signal processing techniques described herein.

Once the data vectors x(t) are determined, the processing unit 106 may construct a data or channel matrix X based on the data vectors x(t) accumulated for N sampling periods, wherein t=1 to N. The data matrix X of the data vectors may be expressed as:

$$X[\underline{x}(t_1)\underline{x}(t_2) \ldots \underline{x}(t_N)]$$

The data matrix X may be an M×N matrix. In one implementation, the data matrix X may have M columns corresponding to the number of sensors and N rows corresponding to the number of samples of the digital signals received from the receiver unit over a period of time. Each column of the data matrix X may represent a time series for a specific sensor (e.g., a channel) and each row may represent the samples at an instant for all the M sensors 108 or channels of the sensor array 102.

After the data matrix X is determined, the processing unit 106 may generate an estimated covariance matrix based on the data matrix X. The covariance matrix may be estimated according to the equation expressed as:

$$R_{xx} = \frac{1}{N} \sum_{i=1}^{N} X(t_i) X^*(t_i)$$

where $X(t_i)$ is a vector of signals received at the M sensors at time instance t, and X* denotes the conjugate transpose of the data matrix X. The covariance matrix $R_{xx}$ may be a M×M matrix. The covariance matrix R may represent a multiple-input multiple-output channel covariance matrix, as it is formed based on a channel or data matrix which characterizes the channels of a system having multiple receive sensors (e.g., antennas). The diagonal elements of the covariance matrix R may correspond to auto-correlation values of the signal received or sampled by the M sensors 108 of the sensor array 102 at a particular point in time. The auto-correlation values may represent the signal power or energy measurements of the M sensors 108 of the sensor array 102. The off-diagonal elements (e.g., elements not on the diagonal) of the covariance matrix R may correspond to cross-correlation values of the signal sampled by two sensors at a particular point in time. The cross-correlation values may represent time lags between the sensors.

Following the estimation of the covariance matrix, the processing unit 106 may decompose the covariance matrix R into two mutually orthogonal subspaces corresponding to signal and noise subspaces of the eigenspace. The signal and noise subspaces may be identified by performing an eigenvalue decomposition of the covariance matrix R. The eigenvalue decomposition of the covariance matrix R may involve decomposing the matrix into a diagonal matrix having eigenvalues as its diagonal components.

In one embodiment, the processing unit 106 may perform eigen decomposition of the covariance matrix R to obtain M unique eigenvalues $\lambda_1$, $\lambda_2$, . . . , and $\lambda_M$ and a matrix of M eigenvectors $e_1$, $e_2$, . . . $e_M$. The matrix of the M eigenvectors may be represented as E and each of the M eigenvectors may have a length of M. The processing unit 106 may perform the eigen decomposition of the covariance matrix according the equation expressed as:

$$R_{xx}=E\Lambda E^*$$

where R is a covariance matrix, where E is a M×M unitary matrix containing the eigenvectors [$e_1$, $e_2$, . . . $e_M$] corresponding to eigenvalues [$\lambda_1$, $\lambda_2$, . . . , $\lambda_M$] of R, $\Lambda$ is a M×M diagonal matrix of eigenvalues [$\lambda_1$, $\lambda_2$, . . . , $\lambda_N$] of covariance matrix R, and * denotes the Hermitian conjugate transpose or operator. The columns of the unitary matrix E may represent the eigenvectors and may be orthogonal to one another. The diagonal matrix $\Lambda$ may contain non-zero values or elements along the diagonal and zero for the remaining elements (e.g., non-diagonal elements). The values along the diagonal of the diagonal matrix $\Lambda$ may be the eigenvalues [$\lambda_1$, $\lambda_2$, . . . , $\lambda_M$] of the covariance matrix R. These eigenvalues [$\lambda_1$, $\lambda_2$, . . . , $\lambda_M$] may represent signal power. In some embodiments, the processing unit 106 may perform the decomposition of the covariance matrix $R_{xx}$ according the equation expressed as:

$$R_{xx}=\lambda_1\underline{e}_1\underline{e}_1{}^*+\lambda_2\underline{e}_2\underline{e}_2{}^*+\ldots\lambda_M\underline{e}_M\underline{e}_M{}^*.$$

In some embodiments, the processing unit 106 may denoise linear combinations of multiple simultaneous signals. For example, when the signal includes multiple simultaneous signals from different sources, each eigenvector of the signal subspace may represent linear combinations of the spatially distinct signals. Further, the eigenvalues associated with the eigenvectors may represent the power of the linear combination of the spatially distinct signals. When denoising the multiple simultaneous signals, the processing unit 106 may arrange the signal space into vectors that separate the individual signals by their spatial features. For example, the processing unit 106 may transform the eigenvectors in the signal subspace to separate the signals from disparate spatial locations (e.g., azimuth, elevation, etc.). The transformed signal subspace eigenvectors may be used to determine the angle of arrival (AOA) of the received signal instead of the original eigenvectors as further described below.

In some embodiments, the processing unit 106 may use a calibration or reference table of measured eigenvectors, as further described below, to identify signal subspace eigenvectors and to separate the signal subspace eigenvectors from the linear combination into separated signal eigenvectors. The processing unit 106 may separate the signal subspace eigenvectors from the linear combination using Gram-Schmidt orthogonality techniques. The orthogonality techniques may also be used by the processing unit 106 to create nulls for all other signals except the one being examined. The processing unit 106 may use the separated signal vectors to determine the angle of arrive (AOA) of the received signal instead of using the original eigenvectors.

Further, the processing unit 106 may be configured to separate or distinguish the signals from noise. When the signals include noise, an eigenvector matrix and a noise subspace may be determined by the processing unit 106. For example, once the eigenvalues $\lambda_1$-$\lambda_M$ of the covariance matrix R are determined, the processing unit 106 may determine the eigenvectors $e_1$-$e_M$ corresponding to eigenvalues $\lambda_1$-$\lambda_M$. The eigenvectors can represent either the signal subspace or the noise subspace of R. Because all the eigenvectors are mutually orthogonal, the noise subspace may be orthogonal to the signal subspace. Further, each eigenvalue may represent the power of a particular signal or noise element. For example, the eigenvalues of the signal subspace may be measurements of signal power and the eigenvalues of the noise subspace may be measures of noise power. In some embodiments, the noise subspace may be a null space.

To determine the eigenvalues in the signal and the noise subspaces of the eigenspace, the processing unit 106 may be configured to sort the eigenvalues in the ascending order (e.g., lowest to highest). The processing unit 106 may separate the noise values from the signal values since the signal values are typically larger in magnitude than the noise values. In some embodiments, the eigenvalues of the signal subspace may be determined by defining a threshold, $\lambda_T$ which may be used to separate the M eigenvalues into K eigenvalues for the signal subspace and the remaining M·K eigenvalues for noise subspace. For example, the processing unit 106 may define eigenvalues greater than $\lambda_T$ as corresponding to the signal space and the eigenvalues of the covariance matrix R less than $\lambda_T$ as defining the noise subspace, so that the number of eigenvalues of the covariance matrix R greater than $\lambda_T$ is equal to the number K of signal sources. Thus, the processing unit 106 may classify the eigenvectors not in the signal subspace as part of the noise subspace.

Figure 2:
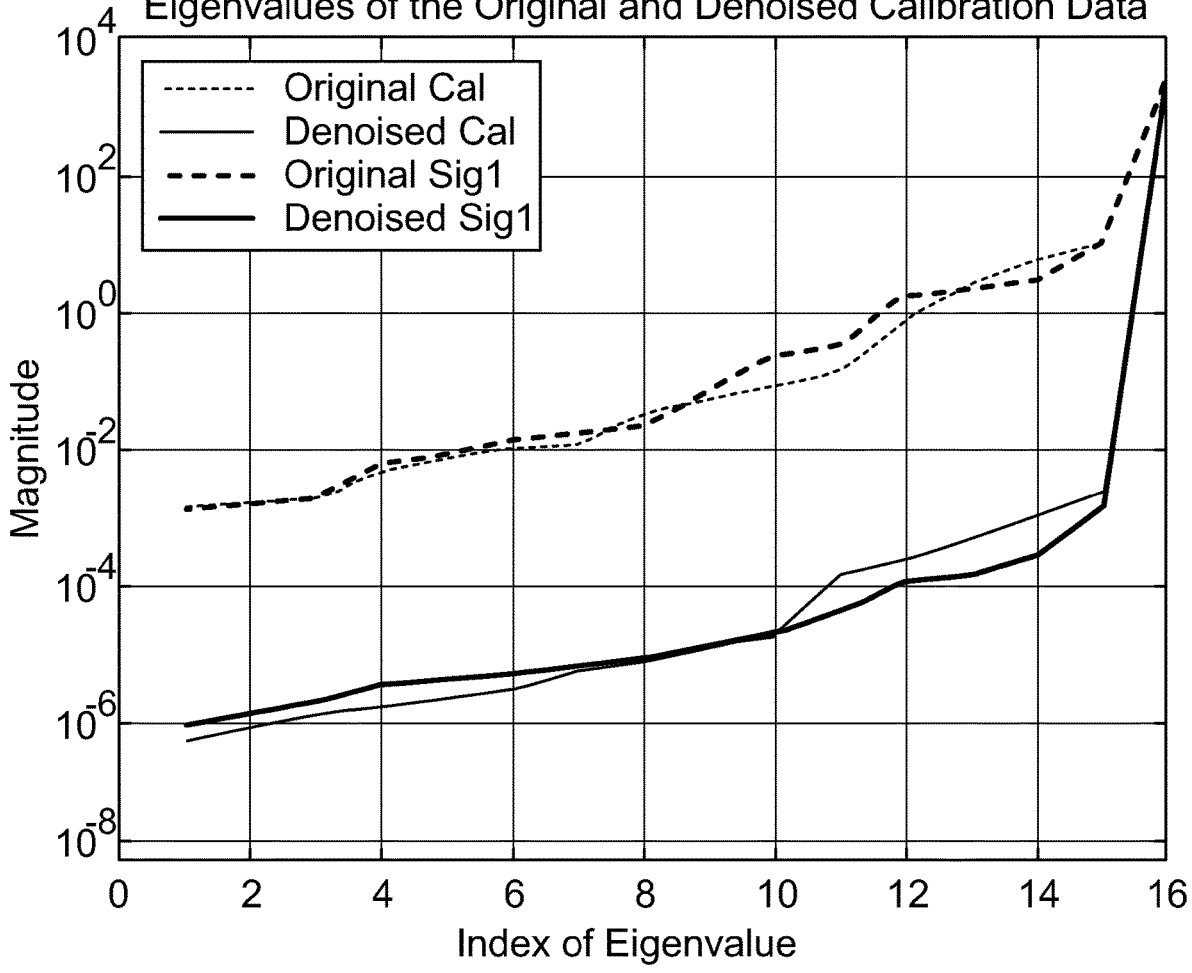
FIG. 2 depicts a graph of signal data measured with a receiver.

FIG. 2 shows a graph illustrating the sorted eigenvalues using a superior receiver before denoising and after denoising the data. In a typical receiver system, the ratio of a single signal eigenvalue to the highest noise eigenvalue is typically numerically 10 to 30 (10 to 15 dB). In a system with a superior receiver, the ratio can be 250 (24 dB). In a system with superior receiver using the denoising techniques described herein, the ratio can be 1,000,000 (60 dB).

Once the eigenvectors are determined, the processing unit 106 may generate a projected data matrix $X_p$ by applying or projecting the data matrix X onto the eigenvectors. The projected data matrix $X_p$ may be expressed as:

$$X_p=XE,$$

where $X_p$ is a N×M projected data matrix, X is a N×M data matrix, and E is a M×M matrix. Since the eigenvectors are orthonormal, further normalization may not be required for the projection. The projection along the eigenvectors may be equivalent to creating one or more beams pointing in directions of all of the signals. For example, the beams may represent an antenna pattern generated from the sensor array.

Since each column of the projected data matrix $X_p$ is a set of time data in the direction of a specific eigenvector, the processing unit 106 may denoise the projected data matrix $X_p$ to generate a denoised projected data matrix $X_{pdenoised}$. The processing unit 106 may perform the denoising operations in the time domain. As a result, the signal-to-noise ratio (SNR) of the signals that are along the eigenvector that points at a signal may be enhanced by a factor of M. In some embodiments, the SNR of the signals may be improved by 36 dB.

Next, the processing unit 106 may be configured to generate a denoised matrix $X_{denoised}$ based on the denoised projected data matrix $X_{pdenoised}$. For example, the processing unit 106 may generate the denoised matrix $X_{denoised}$ by applying or projecting the denoised projected data matrix $X_{pdenoised}$ to one or more of the eigenvectors. The denoised projected data matrix $X_{pdenoised}$ may be projected back to the antenna element space according to the following expression:

$$X_{denoised} = X_{pdenoised} E^{-1} = X_{pdenoised} E^H, \text{ where } H \text{ is the Hermitian operator}$$

Since the denoised matrix $X_{denoised}$ may be an improved set of data than the original data matrix X (e.g., denoised in the time domain), the processing unit 106 may use the denoised matrix $X_{denoised}$ to calculate a more accurate representation of the eigenvectors as further described below.

Once the data matrix has been denoised, the processing unit 106 of the system 100 may be configured to estimate the angle of arrival (AOA) of the signals based on the denoised matrix $X_{denoised}$ and to generate an output including the estimated angle of arrival information, which may for example be communicated to an aircraft's avionics unit for determining a location of an emitting source relative to the aircraft. For example, the processing unit 106 may use the denoised matrix $X_{denoised}$ for estimating the angle of arrival of the signals instead of data matrix X. The angles of arrival of the signals may be determined relative to the antenna array. The computation of the angle of arrival will be further described below.

In some embodiments, the processing unit 106 may use the denoised matrix to improve the accuracy of the eigenvectors and the estimate the angle of arrival of the signal. For example, once the processing unit 106 determines the denoised matrix $X_{denoised}$, the processing unit 106 may use the denoised matrix $X_{denoised}$ to obtain improved eigenvectors. Since the denoised matrix $X_{denoised}$ may be an improved set of data than the original data matrix X (e.g., denoised in the time domain), the processing unit 106 may calculate a more accurate representation of the eigenvectors. In one embodiment, the processing unit 106 can calculate the improved eigenvectors according to the equation as expressed:

$$R_{xdenoisedxdenoised} = E_{improved} \Lambda_{improved} E_{improved}^*$$

Once the improved eigenvectors are determined, the processing unit 106 may generate an improved data matrix $X_{denoised\ 1}$ based on the improved eigenvectors. For example, the processing unit 106 may denoise the data matrix $X_{denoised}$ to get an improved denoised data matrix $X_{denoised\ 1}$. The processing unit 106 may use the improved data matrix $X_{denoised\ 1}$ for estimating the angle of arrival instead of using the denoised data matrix $X_{denoised}$. This denoising process may be performed iteratively as many times as desired until there is no further improvements for denoising of the signals. With each iteration, the accuracy of the eigenvectors may be improved because the eigenvectors of the signals are determined based on denoised data.

When determining the angle of arrival of the signals, the processing unit 106 may use or obtain a stored calibration table of measured eigenvectors for each azimuth and elevation angle for each frequency (e.g., radio frequency) of interest. When creating the eigenvectors for the calibration table, signal data may be collected by a calibrated receiver at various azimuths and elevations. In some embodiments, azimuth scans may be performed using a receiver of an aircraft to cover all of the azimuths and elevations of interest. The receiver of the aircraft may collect signal data and convert the signal data into signal space eigenvectors. In some embodiments, navigation information with matching timing may allow the receiver to label the signal subspace eigenvectors with their associated azimuth, elevation, and frequency. Further, the receiver of the aircraft may also use the airplane pitch, roll and heading information for rotating the eigenvectors into an inertial reference frame. In some implementations, a calibration eigenvector may be stored for each sensor for each frequency with sample points at intervals of several degrees in azimuth and elevation.

The processing unit 106 may be configured to compare the estimated eigenvectors of the signal subspace to the measured eigenvalues of the stored calibration table to find the best match. In some embodiments, the processing unit 106 may use the noise subspace to find the best match rather than the signal subspace of the measured calibration eigenvectors. For example, each eigenvector vector $\underline{a}$ of the calibration table may be a set of complex numbers of length M, where M is the number of antennas. The magnitude and phase of each measured calibrated eigenvector may be expressed as:

$$\underline{a}(Az, El, RF) = \begin{bmatrix} g_1(Az, El, RF)e^{\omega \tau_1} \\ g_2(Az, El, RF)e^{\omega \tau_2} \\ \vdots \\ \vdots \\ g_M(Az, El, RF)e^{\omega \tau_M} \end{bmatrix}$$

where $g_k$ is the gain of the $k^{th}$ antenna as a function of azimuth, elevation, and radio frequency.

The processing unit 106 may compute a matching confidence level (e.g., "goodness of fit") for the eigenvectors according to the equation expressed as:

$$P(Az, El, RF) = \frac{\underline{a}^* \underline{a}}{(\underline{a}^* E_{noise})(E_{noise}^* \underline{a})}$$

where $\underline{a} = \underline{e}_{signal\ Cal}$ and $E_{noise}$ is the collection of noise eigenvectors in the noise subspace of the measurement. The processing unit 106 may compute a matching confidence level (e.g., a goodness of fit) for all of the stored eigenvectors in the calibration table. If the estimated eigenvector is orthogonal, the matching confidence level may be very large for all the stored calibration vectors $\underline{a}$.

Once the best or closest calibrated eigenvector is determined, the processing unit 106 may interpolate between calibrated eigenvalues to get a more precise estimate of the azimuth and elevation for the angle of arrival. For example, the processing unit 106 may interpolate the calibrated eigenvectors over the azimuth and elevation dimensions. If the gain and phase are relatively smooth over the azimuth and elevation, the processing unit 106 may approximate the calibration eigenvector vector that would be obtained from the azimuth and elevation based on the measured values in azimuth and elevation. In one embodiment, the processing unit 106 may approximate a calibration eigenvector that is between two stored calibration eigenvectors based on a maximum of the measure of performance (MOP). For example, the processing unit 106 may interpolate calibration eigenvectors between the stored calibration eigenvectors from the second highest measure of performance (MOP) calibration eigenvector to the third highest measure of performance (MOP) calibration eigenvector. The processing unit 106 may evaluate the measure of performance (MOP) for each interpolated calibration vector to determine the best match. This process may be repeated multiple times to refine the search for better angular resolution.

In one embodiment, the processing unit 106 may determine the accuracy of the estimated angle of arrival (AOA). For example, the processing unit 106 may determine the standard deviation of the error of the estimated angle of arrival based on the equation:

$$\sigma_\theta = \frac{\lambda/L}{\sqrt{m}\,\sqrt{N}\,\sqrt{SNR}} \cdot \frac{1}{\cos\theta} \cdot \frac{\sqrt{6}}{2\pi}$$

where L is the width of the antenna (this may be one dimensional, but azimuth and elevation are separable),
$\theta$ is the angle of arrival (AOA) in radians,
$\lambda$ is the wavelength of the signal,
N is the number of points integrated, and
M is the number of antenna elements.

Figure 3:
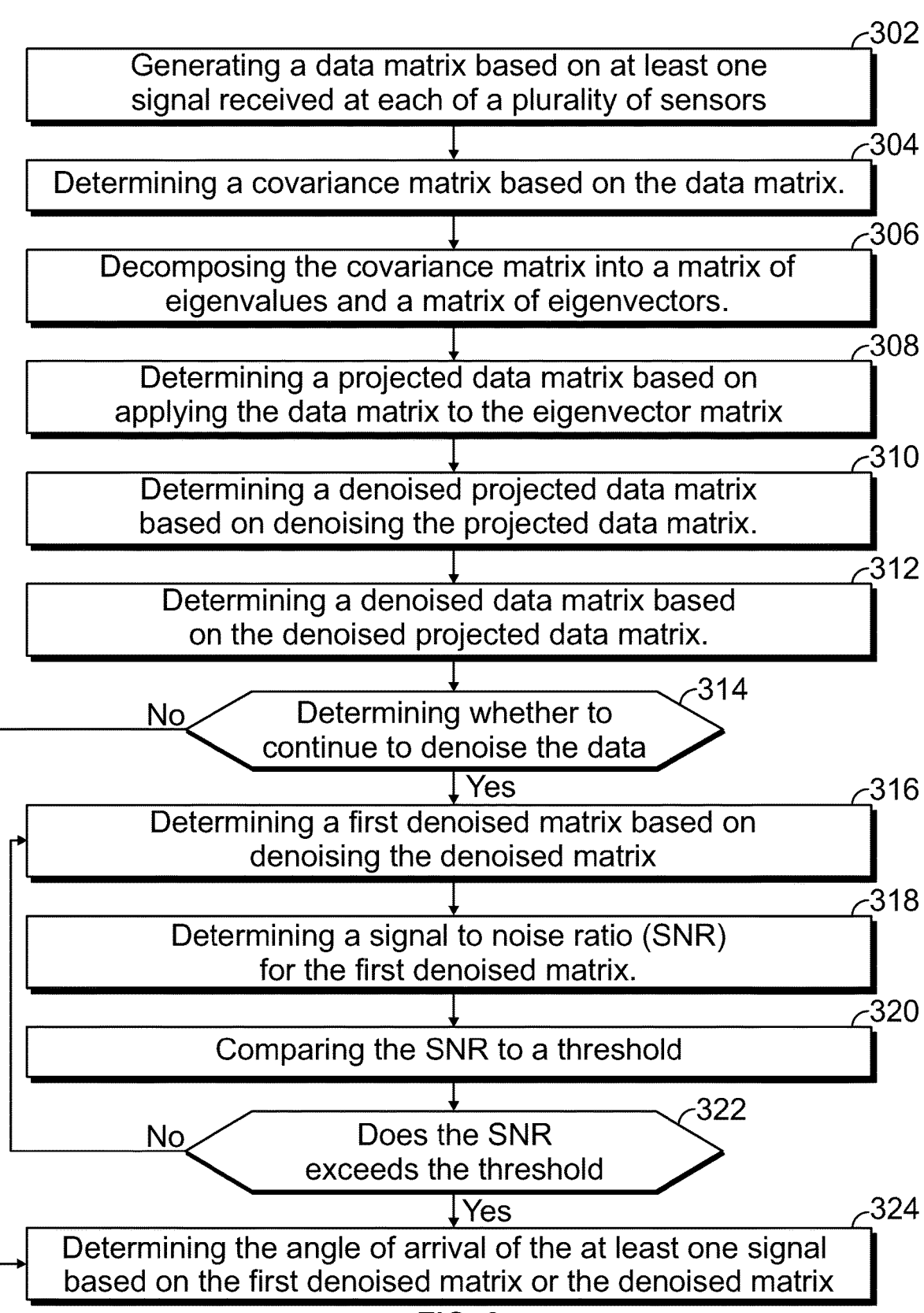
FIG. 3 illustrates a flow chart of a process for estimating an angle of arrival (AOA) of a signal, according to an exemplary embodiment.

FIG. 3 illustrates a flowchart of a method 300 for estimating an angle of arrival, according to an exemplary embodiment. The method 300 may include one or more operations, functions, or actions, as depicted by one or more of blocks 302-324, each of which may be carried out by any of the apparatus, systems, devices, or method shown in prior figures, among other possible systems. The method 300 may be performed in whole or in part by a computing device, such as a device similar to or the same as processing unit 106 described above.

Those skilled in the art will understand that the method 300 illustrates functionality and operation of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

At block 302, the method involves generating a data matrix based on at least one signal received at each of a plurality of sensors. For example, the computing device may receive data elements $x_1$, $x_2$, $x_3$, . . . $x_M$ (e.g., complex baseband IQ signals) for N time samples from each of M sensors of a sensor array. The computing device may construct a data or channel matrix X based on the data vectors x(t) accumulated for N sampling periods, wherein t=1 to N. The data matrix X of the data vectors may be expressed as:

$$X[\underline{x}(t_1)\underline{x}(t_2) \ldots \underline{x}(t_N)]$$

The data matrix X may be an M×N matrix. In one implementation, the data matrix X may have M columns corresponding to the number of sensors and N rows corresponding to the number of samples of the digital elements received from the receiver unit over a period of time. Each column of the data matrix X may represent a time series for a specific sensor (e.g., a channel) and each row may represent the samples at an instant for all the sensors or channels.

At block 304, the method involves determining a covariance matrix based on the data matrix. After the data matrix X is determined, the computing device may generate an estimated covariance matrix based on the data matrix X. The covariance matrix may be estimated according to the equation expressed as:

$$R_{xx} = \frac{1}{N}\sum_{i=1}^{N} X(t_i)X^*(t_i)$$

where $X(t_i)$ is a vector of signals received at the M sensors at time instance t, and $X^*$ denotes the conjugate transpose of the data matrix X. The covariance matrix $R_{xx}$ may be a M×M matrix. In some embodiments, the computing device may calculated the covariance matrix R according to the equation expressed as:

$$R=X^*X'$$

where ' is a Hermitian transpose operator which is the complex-conjugate transpose of a matrix.

At block 306, the method involves decomposing the covariance matrix into a matrix of eigenvalues and a matrix of eigenvectors. The computing device may perform eigen decomposition of the covariance matrix R to obtain M unique eigenvalues $\lambda_1$, $\lambda_2$, . . . , and $\lambda_M$ and a matrix of M eigenvectors $e_1$, $e_2$, . . . $e_M$. The matrix of the M eigenvectors may be represented as E and each of the M eigenvectors may have a length of M. The computing device may perform the eigendecomposition of the covariance matrix according the equation expressed as:

$$R_{xx}=E\Lambda E^*$$

where R is a covariance matrix, where E is a M×M unitary matrix containing the eigenvectors $[e_1, e_2, \ldots e_M]$ corresponding to eigenvalues $[\lambda_1, \lambda_2, \ldots, \lambda_M]$ of R, $\Lambda$ is a M×M diagonal matrix of eigenvalues $[\lambda_1, \lambda_2, \ldots, \lambda_N]$ of covariance matrix R, and * denotes the Hermitian conjugate transpose or operator.

At block 308, the method involves determining a projected data matrix based on applying the data matrix to the eigenvector matrix. Once the eigenvectors are determined, the computing device may generate a projected data matrix $X_p$ by applying or projecting the data matrix X onto the eigenvectors. The projected data matrix $X_p$ may be expressed as:

$$X_p=XE,$$

where $X_p$ is a N×M projected data matrix, X is a N×M data matrix, and E is a M×M matrix.

At block 310, the method involves determining a denoised projected data matrix based on denoising the projected data matrix. The computing device may denoise the projected data matrix $X_p$ to generate a denoised projected data matrix $X_{pdenoised}$.

At block 312, the method involves determining a denoised data matrix based on the denoised projected data matrix. The computing device may be configured to generate a denoised matrix $X_{denoised}$ based on the denoised projected data matrix $X_{pdenoised}$. For example, the processing unit 106 may generate the denoised matrix $X_{denoised}$ by applying or projecting the denoised projected data matrix $X_{pdenoised}$ to one or more of the eigenvectors. The denoised projected data matrix $X_{pdenoised}$ may be projected back to the antenna element space according to the following expression:

$$X_{denoised}=X_{pdenoised}E^{-1}=X_{pdenoised}E^{H}$$

At block 314, the method involves determining whether to continue to denoise the data. If the computing device determines that no further denoising is desired, the method may proceed to block 324. On the other hand, if the computing device determines to continue to denoise the data, the method involves determining a first denoised matrix based on denoising the denoised matrix at block 316. For example, the computing device may use the denoised matrix $X_{denoised}$ to obtain improved eigenvectors. The processing unit 106 can calculate the improved eigenvectors according to the equation as expressed:

$$R_{xdenoisedxdenoised}=E_{improved}\Lambda_{improved}E_{improved}^{*}$$

At block 318, the method involves determining a signal to noise ratio (SNR) for the first denoised matrix. The computing device may compare the SNR to a threshold value at block 320. If the SNR exceeds the threshold at block 322, the method may proceed to block 324. Otherwise, the method may proceed to block 316 to continue to denoise the data.

At block 322, the method involves determining the angle of arrival of the at least one signal based on the first denoised matrix of block 316 or the denoised matrix of block 312. The computing device may estimate the angle of arrival as described above.

In conclusion, the present application relates to embodiments for processing signals, such as wireless communications, using sensor arrays. The sensor arrays may receive signals emitted by one or more sources in an environment. The embodiments may be configured to denoise the received signals to achieve high signal-to-noise ratios (SNR). The embodiments may use the de-noised signals for estimating angle of arrival of the signals received by the sensor array. The embodiments may estimate the angle of arrival (AOA) with higher accuracy compared to other signal processing systems. Further, the embodiments may determine angles of arrival of multiple simultaneous signals and provide maximum signal gain towards all of the signals. The features of the embodiments may provide many benefits for applications such as communication, biomedical imaging, automotive anti-collision radars, and electronic warfare.

By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular examples disclosed, but that the disclosed methods and systems include all embodiments falling within the scope of the appended claims.

What is claimed is:

1. An apparatus comprising:
   a sensor array having a plurality of sensors, each of the sensors configured to receive signals;
   a computing device comprising one or more processors, the one or more processors configured to:
   generate a data matrix based on one or more signals received at each of the plurality of sensors;
   determine a covariance matrix based on the data matrix;
   decompose the covariance matrix into a matrix of eigenvalues and a matrix of eigenvectors;
   determine a projected data matrix based on applying the data matrix to the matrix of eigenvectors;
   determine a denoised projected data matrix based on each column of the projected data matrix being a set of time data in a specific direction of a specific eigenvector;
   determine a denoised data matrix by projecting the denoised projected data matrix;
   determine an angle of arrival of the one or more signals based on the denoised data matrix;
   communicate the angle of arrival to avionics of an aircraft; and
   cause a location to determine an emitting source relative to the aircraft.

2. The apparatus according to claim 1, wherein the determination of the denoised data matrix comprises multiplying the denoised projected data matrix by an inverse of the matrix of eigenvectors.

3. The apparatus according to claim 2, wherein the angle of arrival is further determined based on at least one of a sensor array width, a signal wavelength, a number of sensors, or a number of samples of the one or more signals.

4. The apparatus according to claim 1, wherein the one or more processors are further configured to:
   determine a first denoised matrix based on denoising the denoised data matrix;
   determine a signal to noise ratio (SNR) for the first denoised matrix;
   compare the SNR to a threshold; and
   determine an angle of arrival of the one or more signals based on the first denoised matrix.

5. The apparatus according to claim 4, wherein the one or more processors are further configured to determine an angle of arrival of the one or more signals based on the first denoised matrix.

6. The apparatus according to claim 1, wherein the data matrix has a size of M×N and the covariance matrix has a size of M×M, wherein N equals a number of antenna elements, and wherein M equals a number of samples of the one or more signals.

7. The apparatus according to claim 1, wherein each diagonal element of the covariance matrix indicates an energy level associated with the plurality of sensors, and wherein each non-diagonal element of the covariance matrix indicates a time lag between two sensors.

8. The apparatus according to claim 1, wherein the matrix of eigenvectors includes diagonal elements, each diagonal element of comprises an eigenvalue, and wherein the matrix of eigenvectors includes non-diagonal elements, each non-diagonal element corresponds to a value of zero.

9. The apparatus according to claim 1, wherein each non-zero eigenvalue represents power of a particular signal or noise, and wherein the one or more processors are further configured to select one or more eigenvalues from the eigenvalues based on a comparison of each non-zero eigenvalue to a threshold value.

10. The apparatus according to claim 9, wherein the selected one or more eigenvalues correspond to signal eigenvalues.

11. The apparatus according to claim 1, wherein each eigenvector represents a linear combination of spatially distinct signals, wherein each eigenvalue represents power of the spatially distinct signals of an associated eigenvector, and wherein the eigenvectors are orthonormal.

12. The apparatus according to claim 1, wherein the one or more processors are configured to determine each eigenvector based on a transformation of a linear combination of eigenvectors associated with different spatial locations.

13. The apparatus according to claim 1, wherein the one or more processors are further configured to:
   determine a first covariance matrix based on the denoised data matrix;
   decompose the first covariance matrix into a matrix of first eigenvalues and a matrix of first eigenvectors;
   determine a first projected data matrix based on applying the denoised data matrix to one or more of the first eigenvectors;
   determine a first denoised projected data matrix based on denoising the first projected data matrix;
   determine a first denoised matrix based on the first denoised projected data matrix; and
   determine an angle of arrival of the one or more signals based on the first denoised matrix.

14. The apparatus according to claim 1, wherein the one or more processors are configured to:
   determine a new denoised matrix when a signal to noise ratio for the denoised matrix does not exceed a threshold.

15. A method comprising:
   receiving one or more signals at a sensor apparatus, the sensor apparatus having a plurality of sensors, wherein each of the plurality of sensors is configured to receive one or more signals;
   generating, by one or more processors, a data matrix based on one or more signals received at each of the plurality of sensors;
   determining, by the one or more processors, a covariance matrix based on the data matrix;
   decomposing, by the one or more processors, the covariance matrix into a matrix of eigenvalues and a matrix of eigenvectors;
   determining, by the one or more processors, a projected data matrix based on applying the data matrix to one or more of the eigenvectors;
   determining, by the one or more processors, a denoised projected data matrix based on each column of the projected data matrix being a set of time data in a specific direction of a specific eigenvector;
   determining, by the one or more processors, a denoised matrix by projecting the denoised projected data matrix;
   determining, by the one or more processors, an angle of arrival of the one or more signals based on the denoised matrix;
   communicating, by the one or more processors, the angle of arrival to an avionics unit of an aircraft; and
   causing, by the one or more processors, a location to determine an emitting source relative to the aircraft.

16. The method according to claim 15, further comprising:

determining a first denoised matrix based on denoising the denoised matrix;

determining a signal to noise ratio (SNR) of the eigenvalues;

comparing the SNR of each of the eigenvalues to a threshold; and determining an angle of arrival of the one or more signals based on the first denoised matrix.

17. The method according to claim 15, wherein each eigenvector, in the matrix of eigenvectors, is determined based on a transformation of a linear combination of eigenvectors associated with different spatial locations.

18. The method according to claim 15, further comprising:

determining a first covariance matrix based on the denoised matrix;

decomposing the first covariance matrix into a matrix of first eigenvalues and a matrix of first eigenvectors;

determining a first projected data matrix based on applying the denoised matrix to one or more of the eigenvectors;

determining a first denoised projected data matrix based on denoising the first projected data matrix;

determining a first denoised matrix based on the first denoised projected data matrix; and determining an angle of arrival of the one or more signals based on the first denoised matrix.

19. The method according to claim 15, wherein each non-zero eigenvalue represents power of a particular signal or noise, and the method further comprising:

selecting one or more eigenvalues from the eigenvalues based on a comparison of each eigenvalue, of the eigenvalues, to a threshold value.

20. A non-transitory computer-readable medium having stored thereon instruction code, wherein the instruction code is executable by one or more processors to perform operations comprising:

receiving one or more signals;

generating a data matrix based on the one or more signals;

determining a covariance matrix based on the data matrix;

decomposing the covariance matrix into a matrix of eigenvalues and a matrix of eigenvectors;

determining a projected data matrix based on applying the data matrix to one or more of the eigenvectors;

determining a denoised projected data matrix based on denoising the projected data matrix;

determining a denoised matrix by projecting the denoised projected data matrix;

determining, by the one or more processors, an angle of arrival of the one or more signals based on the denoised matrix;

communicating, by the one or more processors, the angle of arrival to an avionics unit of an aircraft; and causing, by the one or more processors, a location to determine an emitting source relative to the aircraft.

\* \* \* \* \*